United States Patent
Jin

(10) Patent No.: US 11,801,724 B2
(45) Date of Patent: Oct. 31, 2023

(54) SYSTEM AND METHOD OF CONTROLLING AIR SUPPLY DEVICE

(71) Applicants: Hyundai Motor Company, Seoul (KR); Kia Corporation, Seoul (KR)

(72) Inventor: Jung Hoon Jin, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 339 days.

(21) Appl. No.: 17/396,943

(22) Filed: Aug. 9, 2021

(65) Prior Publication Data

US 2022/0203796 A1    Jun. 30, 2022

(30) Foreign Application Priority Data

Dec. 31, 2020   (KR) .................. 10-2020-0188621

(51) Int. Cl.
| | |
|---|---|
| B60T 13/26 | (2006.01) |
| B60T 17/06 | (2006.01) |
| B60G 17/0195 | (2006.01) |
| B60T 13/66 | (2006.01) |
| B60G 17/015 | (2006.01) |
| F15B 1/26 | (2006.01) |
| B60R 16/033 | (2006.01) |
| B60L 58/12 | (2019.01) |
| B60L 58/30 | (2019.01) |

(52) U.S. Cl.
CPC ..... B60G 17/0195 (2013.01); B60G 17/0155 (2013.01); B60R 16/033 (2013.01); B60T 13/268 (2013.01); B60T 13/66 (2013.01); B60T 17/06 (2013.01); F15B 1/265 (2013.01); B60G 2300/042 (2013.01); B60G 2500/205 (2013.01); B60L 58/12 (2019.02); B60L 58/30 (2019.02); B60L 2200/28 (2013.01)

(58) Field of Classification Search
CPC ............ B60G 17/0195; B60G 17/0155; B60G 2300/042; B60G 2500/205; B60G 2400/50; B60G 2400/97; B60R 16/033; B60T 13/662; B60T 13/268; B60T 13/66; B60T 17/06; B60T 17/02
See application file for complete search history.

(56) References Cited

U.S. PATENT DOCUMENTS

| | | | | |
|---|---|---|---|---|
| 4,568,129 | A | * | 2/1986 | Stumpe ................. B60T 13/683 303/22.8 |
| 11,447,108 | B1 | * | 9/2022 | Bailey ..................... B60T 8/172 |
| 2004/0207514 | A1 | * | 10/2004 | Lesesky ................. G08G 1/017 340/431 |

* cited by examiner

*Primary Examiner* — George C Jin
(74) *Attorney, Agent, or Firm* — MORGAN, LEWIS & BOCKIUS LLP

(57) ABSTRACT

An air supply device control system may include a sensor configured to detect a trailer to be provided in an eco-friendly commercial vehicle, an air supply device configured to compress and supply air, and a controller electrically connected to the air supply device and configured to control rotation speed of the air supply device to control the air of the air supply device, wherein the controller increases the rotation speed of the air supply device based on whether the trailer is provided in the eco-friendly commercial vehicle, which is detected by the sensor.

16 Claims, 3 Drawing Sheets

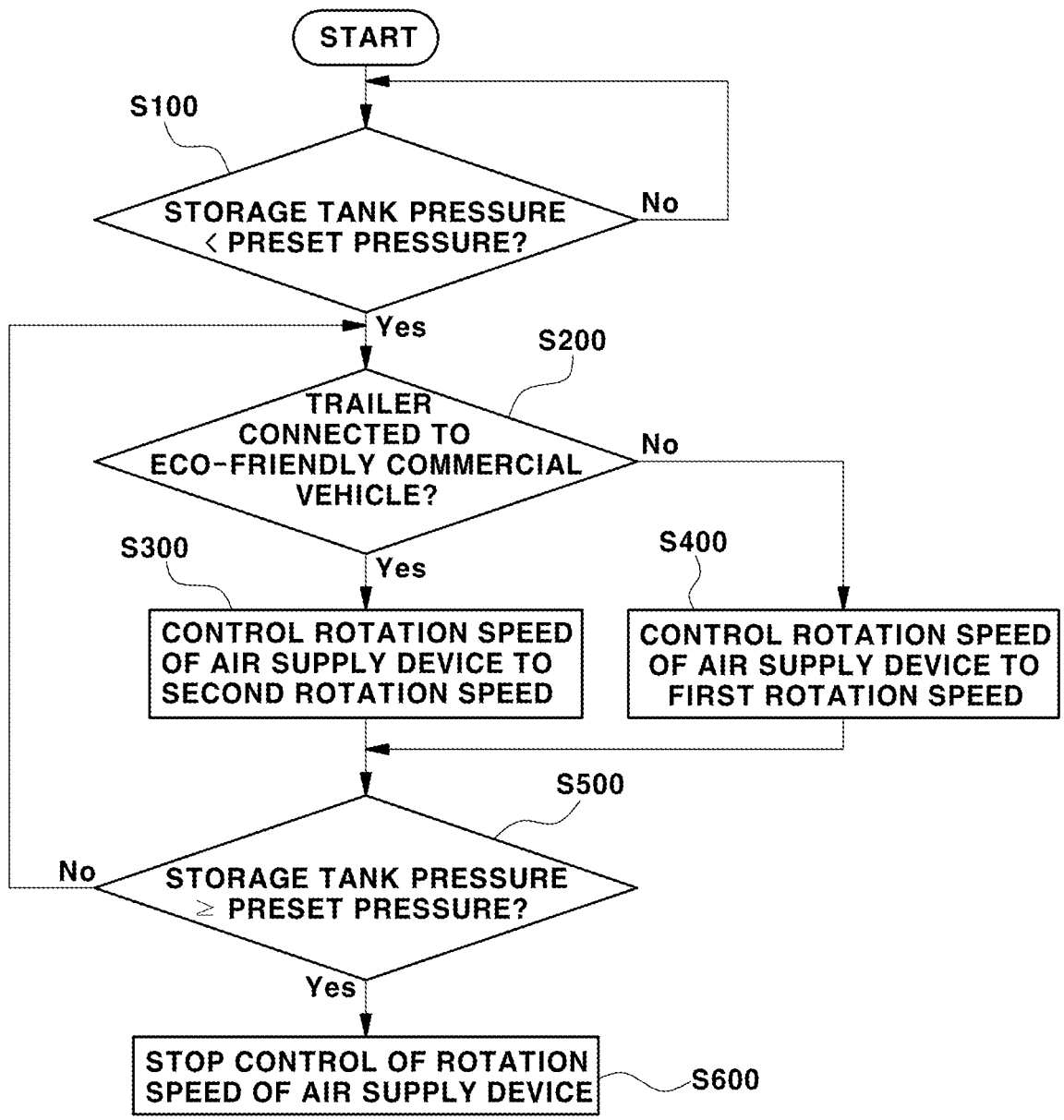

SYSTEM AND METHOD OF CONTROLLING AIR SUPPLY DEVICE

CROSS-REFERENCE TO RELATED APPLICATION

The present application claims priority to Korean Patent Application No. 10-2020-0188621 filed on Dec. 31, 2020, the entire contents of which is incorporated herein for all purposes by this reference.

BACKGROUND OF THE PRESENT INVENTION

Field of the Invention

The present invention relates to a system and method of controlling an air supply device for controlling rotation speed of an air supply device.

Description of Related Art

Commercial vehicles have applied a pneumatic brake using air for ensuring braking force and an air suspension for ensuring vehicle stability. To supply air required by the pneumatic brake and the air suspension, an air supply device is provided in a commercial vehicle.

Conventionally, when a trailer is connected to a commercial vehicle, an originally required air filling amount is increased, and thus a time taken to fill air is increased. Since the air supply device is mechanically connected to an engine, revolutions per minute (RPM) of the air supply device is determined depending on the RPM of an engine, and thus a driver needs to increase the RPM of the air supply device by accelerating an accelerator pedal to rapidly fill air. In the instant case, revolutions per minute (RPM) of the engine is simultaneously increased, and thus there is a problem in that fuel efficiency of a vehicle is degraded and exhaust gas emission is increased. A driver needs to keep depressing an accelerator pedal, and thus is inconvenience in vehicle driving. As the revolutions per minute (RPM) of an engine is increased, carbide of engine lubricant crosses the air supply device, and thus there is a problem in that the durability of the air supply device is degraded.

A conventional commercial vehicle utilizes an engine, in which case the engine and the air supply device are mechanically connected. However, an eco-friendly commercial vehicle does not apply an engine, and thus a method of driving the air supply device has not been developed in detail.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a system and method of controlling an air supply device configured for ensuring braking force of a vehicle and improving the stability of the vehicle by controlling rotation speed of the air supply device based on a pressure of a storage tank and whether a trailer is connected to a vehicle.

Various aspects of the present invention provide an air supply device control system. The air supply device control system may include a sensor configured to detect whether a trailer is coupled to a vehicle, an air supply device configured to compress and supply air, and a controller electrically connected to the air supply device and configured to control rotation speed of the air supply device to control the air of the air supply device, wherein the controller increases the rotation speed of the air supply device according to whether the trailer is provided to the vehicle, which is detected by the sensor.

For example, the air supply device control system may further include a storage tank of storing the air compressed by the air supply device, and a pressure sensor configured to measure a pressure of the air stored in the storage tank, wherein, when the pressure of the air stored in the storage tank is less than a preset pressure and the trailer is provided to the vehicle, the controller controls the rotation speed of the air supply device.

For example, when the pressure of the air stored in the storage tank reaches a maximum pressure, the controller may stop rotation of the air supply device.

For example, the controller may be a vehicle control unit (VCU) provided in the vehicle.

For example, the controller and the air supply device may be modularized and provided in the vehicle.

For example, the controller may supply the compressed air to a pneumatic brake and an air suspension fluidically connected to the air supply device.

For example, a high-voltage battery applied to the vehicle may supply power required for driving of the air supply device.

Various exemplary embodiments of the present invention may provide a method of controlling an air supply device. The method may include measuring, by a pressure sensor, a pressure of a storage tank having air stored therein, when the pressure of the storage tank is less than a preset pressure, determining, by a controller, whether a trailer is connected to a vehicle, and controlling, by the controller, a rotation speed of an air supply device configured to compress air based on whether the trailer is connected to the vehicle.

For example, when the pressure of the storage tank is increased and reaches a preset pressure, the controller may stop control of the rotation speed of the air supply device.

For example, when the pressure of the storage tank is equal to or greater than the preset pressure before the rotation speed of the air supply device is controlled, the controller may not control the air supply device without consideration of whether the trailer is connected to the vehicle.

For example, when the trailer is not connected to the vehicle, the controller may be configured to control the rotation speed of the air supply device to a first rotation speed, when the trailer is connected to the vehicle, the controller may be configured to control the rotation speed of the air supply device to a second rotation speed, and the second rotation speed may be greater than the first rotation speed.

For example, when the trailer is connected to the vehicle and a state of charge (SOC) value of a high-voltage battery configured to supply power to the air supply device is equal to or less than a predetermined value, the controller may be configured to control the rotation speed of the air supply device to a speed which is higher than the first rotation speed and is lower than the second rotation speed.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 5 is a flowchart for explaining a method of controlling an air supply device according to various exemplary embodiments of the present invention.

Figure 1:
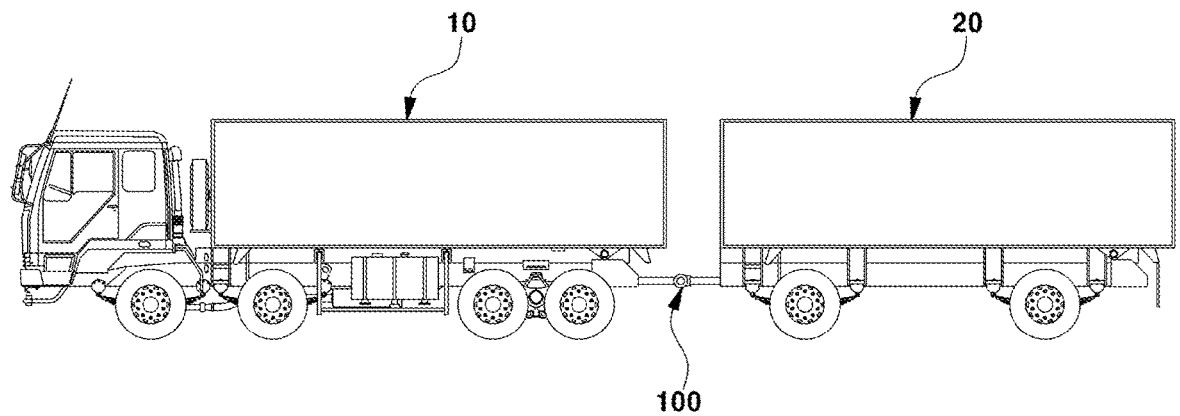
FIG. 1 is a diagram showing the state in which a trailer is connected to an eco-friendly commercial vehicle.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

The appended drawings for illustrating exemplary embodiments of the present invention are to be referred to in order to gain a sufficient understanding of the present invention, the merits thereof, and the objectives accomplished by the implementation of the present invention. The present invention may, however, be embodied in various forms, and may not be construed as being limited to the exemplary embodiments set forth herein; rather, these embodiments are provided so that the present disclosure will be thorough and complete, and will fully convey the concept of the present invention to one of ordinary skill in the art. Meanwhile, the terminology used herein is for describing various exemplary embodiments and is not intended to limit the present invention. Like reference numerals in the drawings denote like elements.

Terms such as 'unit' or 'module', etc., may be understood to indicate units that process at least one function or operation and which may be embodied in a hardware manner, a software manner, or a combination of a hardware manner and a software manner.

Terms, such as "first", "second", and the like used in the specification may be used to distinguish the relevant elements using the reference relationship, and are not limited by the order.

The detailed description is used to exemplify the present invention. The description herein is provided to show exemplary embodiments of the present invention, and the present invention may be used in various other combinations, changes, and environments. That is, the present invention may be changed or modified within the scope of the concept of the present invention disclosed in the specification, the equivalent scope of the provided disclosure, and/or the scope of the technology or knowledge in the art. The described embodiment is the ideal embodiment for implementing the technological spirit of the present invention, but may be changed in various forms required in detailed applications and use of the present invention. Thus, the detailed description of the present invention herein is merely exemplary, and is not intended to limit the present invention. The following claims are to be interpreted as including other embodiments.

Figure 2:
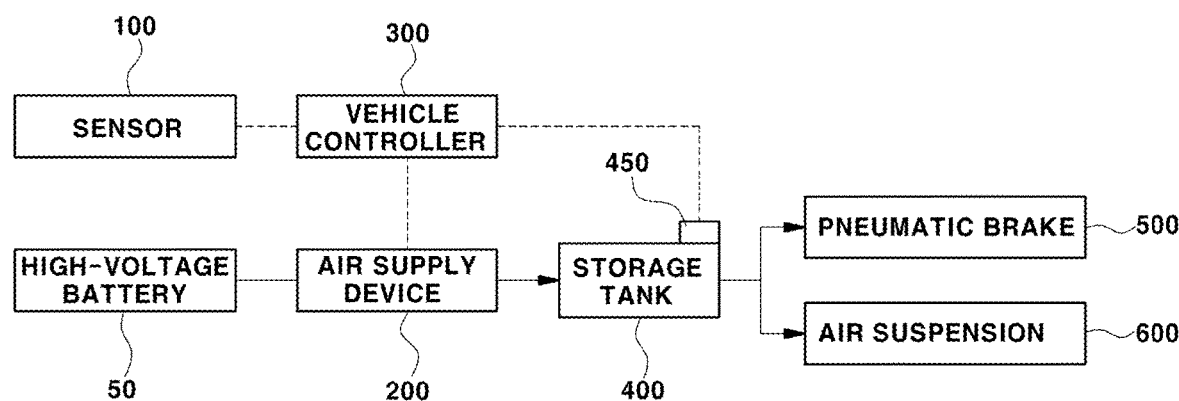
FIG. 2 is a diagram showing an air supply device control system according to various exemplary embodiments of the present invention.

FIG. 1 is a diagram showing the state in which a trailer is connected to an eco-friendly commercial vehicle. FIG. 2 is a diagram showing an air supply device control system according to various exemplary embodiments of the present invention.

Referring to FIG. 1 and FIG. 2, an air supply device control system for controlling an air supply device 200 may be applied to an eco-friendly commercial vehicle 10. The air supply device control system may include a sensor 100, the air supply device 200, a vehicle controller 300, a storage tank 400, and a pressure sensor 450. The eco-friendly commercial vehicle 10 may be a pure electric vehicle (EV) or a fuel cell electric vehicle (FCEV) to which an engine is not applied.

The sensor 100 may detect whether a trailer 20 is coupled to the eco-friendly commercial vehicle 10. The sensor 100 may be provided in a part to which the eco-friendly commercial vehicle 10 and the trailer 20 are physically connected. Information measured by the sensor 100 may be transmitted to the vehicle controller 300.

The air supply device 200 may be a device configured for compressing air provided to a pneumatic brake 500 and an air suspension 600. In general, the pneumatic brake 500 using air may be applied to the eco-friendly commercial vehicle 10. The air supply device 200 may adjust the pressure of air in the storage tank 400 which is a space for storing air therein. Air may be compressed by a rotation of the air supply device 200. For example, the pressure of air in the storage tank 400 may be maintained in 9 bar to 12 bar. The air supply device 200 may provide air stored in the storage tank 400 to the pneumatic brake 500 and the air suspension 600. In the instant case, the storage tank 400 may store air compressed by the air supply device 200.

The air supply device 200 may be an independently driven device and may be driven by receiving power from a high-voltage battery 50 provided in the eco-friendly commercial vehicle 10. A high-voltage air compressor may be applied to the air supply device 200. In the instant case, the high-voltage air compressor may require a voltage greater than 24 V. The high-voltage battery 50 may be a component for supplying power to a motor provided in the eco-friendly commercial vehicle 10. Air supply by the air supply device 200 may be closely associated with braking force of a vehicle, and thus the air supply device 200 may always receive power irrespective of a state of charge (SOC) value of the high-voltage battery 50.

The vehicle controller 300 may control the rotation speed of the air supply device 200 and may control air supply by the air supply device 200. For example, the vehicle controller 300 may be a vehicle control unit (VCU). The vehicle controller 300 may control the rotation of the air supply device 200 based on whether the trailer 20 is coupled to the eco-friendly commercial vehicle 10, which is received from the sensor 100, and the pressure of air in the storage tank 400, which is received from the pressure sensor 450.

For example, when the trailer 20 is not coupled to the eco-friendly commercial vehicle 10, the vehicle controller 300 may control the rotation speed of the air supply device 200 to a first rotation speed until the pressure of air in the storage tank 400 reaches to a preset pressure. For example, the preset pressure may be 9 bar, but may be changed by a designer. For example, the first rotation speed may be 1200 rpm, but may be changed by a designer.

For example, when the trailer 20 is coupled to the eco-friendly commercial vehicle 10, the vehicle controller 300 may control the rotation speed of the air supply device 200 to a second rotation speed until the pressure of air in the storage tank 400 reaches a preset pressure. The second rotation speed may be greater than the first rotation speed. For example, the second rotation speed may be 1400 rpm, but may be changed by a designer. When the trailer 20 is connected to the eco-friendly commercial vehicle 10, a larger air amount needs to be supplied while the eco-friendly commercial vehicle 10 travels. Thus, when the air supply device 200 is controlled at the same speed as the existing speed (which is the first rotation speed according to various exemplary embodiments of the present invention) to fill air, a time taken to fill air to the storage tank 400 may be increased. When the time taken to fill air to the storage tank 400 is increased, the driving stability of the eco-friendly commercial vehicle 10 may be adversely affected, and accordingly, control logic for increasing rotation speed of the air supply device 200 to more rapidly fill air to the storage tank 400 when the trailer 20 is coupled to the eco-friendly commercial vehicle 10 may be applied.

For example, when the pressure of air stored in the storage tank 400 reaches the maximum pressure, the vehicle controller 300 may stop rotation of the air supply device 200. For example, the maximum pressure may be set to a preset pressure of 9 bar, but may be changed by a designer.

For example, when an SOC value of the high-voltage battery 50 is equal to or less than a predetermined value, the vehicle controller 300 may reduce the rotation speed of the air supply device 200. For example, the predetermined value may be 20%. The vehicle controller 300 may reduce the rotation speed of the air supply device 200 in a situation in which there is concern in that the high-voltage battery 50 is discharged. When the trailer 20 is connected to the eco-friendly commercial vehicle 10 but an SOC value of the high-voltage battery 50 is equal to or less than a predetermined value, the vehicle controller 300 may control the rotation speed of the air supply device 200 to a speed which is higher than the first rotation speed and is lower than the second rotation speed.

Unlike in the aforementioned example, when an SOC value of the high-voltage battery 50 is equal to or less than a predetermined value, the vehicle controller 300 may lower the rotation speed of the air supply device 200 compared with the first rotation speed.

According to various exemplary embodiments of the present invention, the air supply device control system may increase the rotation speed of the air supply device 200 to ensure braking force of a vehicle, which is further required as the trailer 20 is connected to the eco-friendly commercial vehicle 10. Accordingly, it may be possible to ensure the braking force and stability of the vehicle.

Figure 3:
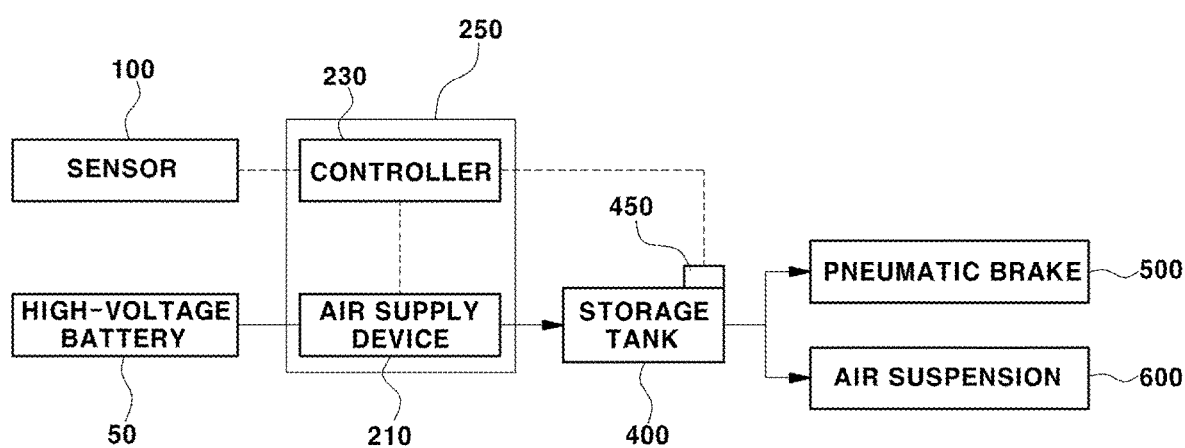
FIG. 3 is a diagram showing an air supply device control system according to various exemplary embodiments of the present invention.

FIG. 3 is a diagram showing an air supply device control system according to various exemplary embodiments of the present invention. For a brief description, components denoted by the same reference numeral in FIG. 2 and FIG. 3 will be omitted.

Referring to FIGS. 1 and 3, information on whether the trailer 20 is connected to the eco-friendly commercial vehicle 10, which is measured by the sensor 100, may be transmitted to a controller 230 in an air supply module 250. In the instant case, the controller 230 may be modularized in the air supply module 250. In other words, the controller 230 and an air supply device 210 may be modularized and provided in the eco-friendly commercial vehicle 10. The controller 230 may receive information related to the pressure of air in the storage tank 400, measured by the pressure sensor 450.

According to various exemplary embodiments of the present invention, the air supply device 210 for supplying air to the pneumatic brake 500 and the air suspension 600 and the controller 230 for controlling the air supply device 210 may be modularized. Thus, the air supply device 210 may be controlled by the controller 230 in the air supply module 250 rather than being controlled by the vehicle control unit (VCU), and thus it may be possible to perform control to supply air the pneumatic brake 500 and the air suspension 600 just by installing the modularized air supply module 250 in a vehicle. In other words, control logic for air supply may be executed without change and development of the vehicle control unit (VCU).

Figure 4:
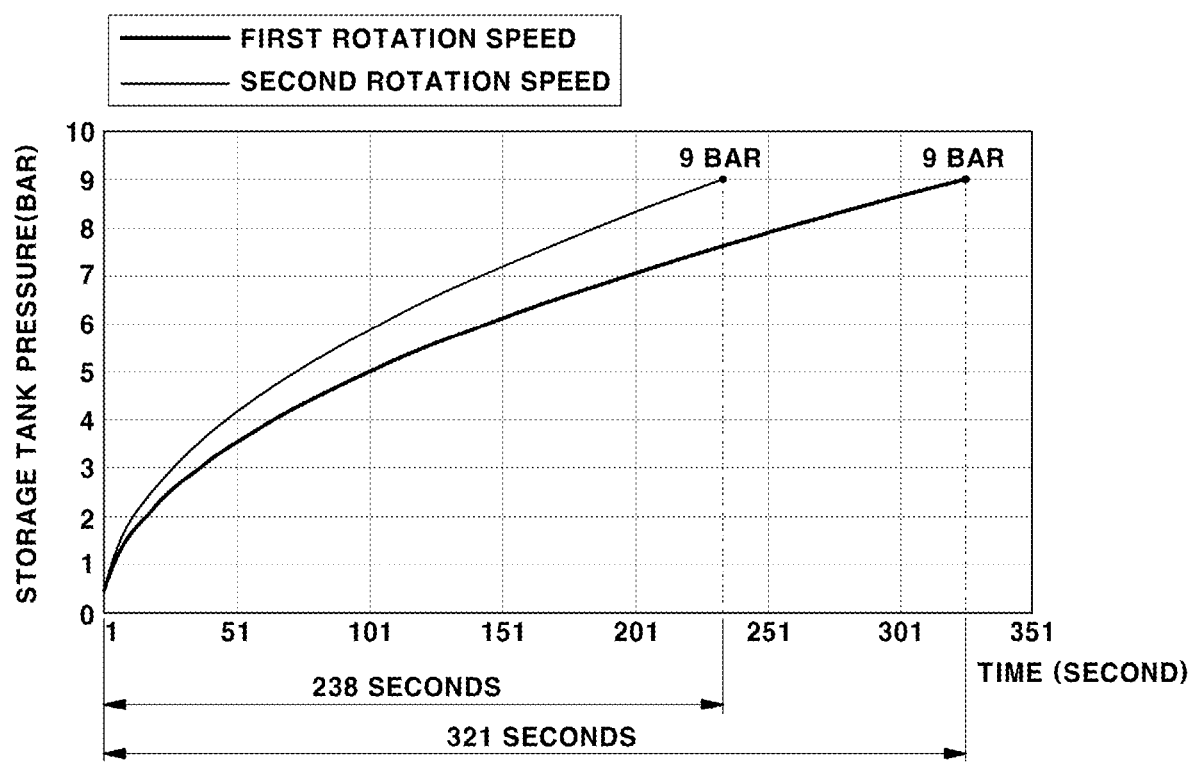
FIG. 4 is a graph showing an air filling time under control of an air supply device according to various exemplary embodiments of the present invention.

FIG. 4 is a graph showing an air filling time under control of an air supply device according to various exemplary embodiments of the present invention.

FIG. 4 shows a change in the pressure in a storage tank when an air supply device is controlled at a first rotation speed and is controlled at a second rotation speed. A preset pressure (the maximum pressure) of the storage tank may be set to 9 bar. The first rotation speed may be smaller than the second rotation speed.

When the rotation speed of the air supply device is the first rotation speed, 238 seconds may be taken until the storage tank reaches a preset pressure. When the rotation speed of the air supply device is the second rotation speed, 321 seconds may be taken until the storage tank reaches the present pressure. That is, when a trailer is connected to an eco-friendly commercial vehicle, air needs to be relatively rapidly supplied/compressed to the storage tank to ensure braking force of the vehicle. Thus, when the trailer is connected to the eco-friendly commercial vehicle, braking force of the eco-friendly commercial vehicle may be ensured and the stability of the vehicle may be improved by increasing the rotation speed of the air supply device, compared with the case in which the trailer is not connected to the eco-friendly commercial vehicle.

FIG. 5 is a flowchart for explaining a method of controlling an air supply device according to various exemplary embodiments of the present invention.

Referring to FIG. 5, a pressure sensor may measure the pressure of a storage tank that stores and compresses air. When the pressure of air in the storage tank is equal to or greater than a preset pressure, a controller may not control the air supply device. In terms of the stability of a system, when the pressure of air in the storage tank reaches a preset pressure, air supply into the storage tank needs to be stopped (S100).

When the pressure of air in the storage tank is less than the preset pressure, the sensor may detect whether the eco-friendly commercial vehicle is connected to the trailer. The sensor may transmit a signal indicating that the trailer is connected to the eco-friendly commercial vehicle, to a controller. The controller may be a vehicle control unit (VCU) and may refer to a controller provided in an air supply module for supplying air into the storage tank (S200).

When the trailer is connected to the eco-friendly commercial vehicle, the controller may increase the rotation speed of the air supply device to the second rotation speed (S300).

When the trailer is not connected to the eco-friendly commercial vehicle, the controller may maintain the rotation speed of the air supply device in the first rotation speed. In other words, when the eco-friendly commercial vehicle is connected to the trailer, the controller may increase the rotation speed of the air supply device that was being rotated at the first rotation speed, to the second rotation speed (S400).

As air is supplied to the storage tank, the pressure of air in the storage tank may be increased. Until the pressure of air in the storage tank reaches a preset pressure, the controller may continuously monitor whether the trailer is connected to the eco-friendly commercial vehicle or whether the trailer is separated from the eco-friendly commercial vehicle. The controller may be configured to control the rotation speed of the air supply device based on the monitored information (S500).

When the pressure of air in the storage tank reaches a preset pressure, the controller may stop control of the rotation speed of the air supply device. That is, the controller may stop driving of the air supply device (S600).

According to various exemplary embodiments of the present invention, the air supply device may be controlled by a separate controller in an air supply module rather than being controlled by the vehicle control unit (VCU), and thus it may be possible to perform control to supply air to the pneumatic brake and the air suspension just by installing the modularized air supply module in a vehicle. In other words, control logic for air supply may be executed without change and development of the vehicle control unit (VCU).

According to various exemplary embodiments of the present invention, the air supply device control system may increase the rotation speed of the air supply device to ensure braking force of a vehicle, which is further required as the trailer is connected to the eco-friendly commercial vehicle. Accordingly, it may be possible to ensure the braking force and stability of the vehicle Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a control device, and the control device may be configured by a plurality of control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An air supply device control system comprising:
   a sensor configured to detect whether a trailer is provided to a vehicle;
   an air supply device configured to compress and supply air; and a controller electrically connected to the air supply device and configured to control rotation speed of the air supply device to control air flow of the air supply device, wherein the controller is configured to control the rotation speed of the air supply device according to whether the trailer is provided to the vehicle, which is detected by the sensor.

2. The air supply device control system of claim 1, further including:

a storage tank fluidically connected to the air supply device and of storing the air compressed by the air supply device; and a pressure sensor configured to measure a pressure of the air stored in the storage tank, wherein, when the pressure of the air stored in the storage tank is less than a preset pressure and the trailer is provided to the vehicle, the controller electrically connected to the pressure sensor is configured to increase the rotation speed of the air supply device.

3. The air supply device control system of claim 2, wherein, when the pressure of the air stored in the storage tank reaches a maximum pressure, the controller is configured to stop a rotation of the air supply device.

4. The air supply device control system of claim 1, wherein the controller is a vehicle control unit (VCU) provided in the vehicle.

5. The air supply device control system of claim 1, wherein the controller and the air supply device are modularized and provided in the vehicle.

6. The air supply device control system of claim 1, wherein the controller is configured to control the air supply device to supply the compressed air to a pneumatic brake and an air suspension fluidically connected to the air supply device.

7. The air supply device control system of claim 1, wherein a battery applied to the vehicle is configured to supply power required for driving of the air supply device.

8. The air supply device control system of claim 7, wherein when the trailer is not connected to the vehicle, the controller is configured to control the rotation speed of the air supply device to a first rotation speed; and when the trailer is connected to the vehicle, the controller is configured to control the rotation speed of the air supply device to a second rotation speed, wherein the second rotation speed is greater than the first rotation speed.

9. The air supply device control system of claim 8, wherein, when the trailer is connected to the vehicle and a state of charge (SOC) value of the battery configured to supply the power to the air supply device is equal to or less than a predetermined value, the controller is configured to control the rotation speed of the air supply device to a speed which is higher than the first rotation speed and is lower than the second rotation speed.

10. The air supply device control system of claim 1, wherein when the trailer is not connected to the vehicle, the controller is configured to control the rotation speed of the air supply device to a first rotation speed; and when the trailer is connected to the vehicle, the controller is configured to control the rotation speed of the air supply device to a second rotation speed, wherein the second rotation speed is greater than the first rotation speed.

11. A method of controlling an air supply device, the method comprising:

measuring, by a pressure sensor, a pressure of a storage tank having air stored therein and fluidically connected to the air supply device of a vehicle;

when the pressure of the storage tank is less than a preset pressure, determining, by a controller, whether a trailer is connected to the vehicle; and controlling, by the controller electrically connected to the air supply device, a rotation speed of the air supply device configured to compress air according to whether the trailer is connected to the vehicle.

12. The method of claim 11, wherein, when the pressure of the storage tank is increased and reaches a preset pressure, the controller is configured to stop control of the rotation speed of the air supply device.

13. The method of claim 11, wherein, when the pressure of the storage tank is equal to or greater than the preset pressure before the rotation speed of the air supply device is controlled, the controller does not control the air supply device without consideration of whether the trailer is connected to the vehicle.

14. The method of claim 11, wherein when the trailer is not connected to the vehicle, the controller is configured to control the rotation speed of the air supply device to a first rotation speed; and when the trailer is connected to the vehicle, the controller is configured to control the rotation speed of the air supply device to a second rotation speed, wherein the second rotation speed is greater than the first rotation speed.

15. The method of claim 14, wherein, when the trailer is connected to the vehicle and a state of charge (SOC) value of a battery configured to supply power to the air supply device is equal to or less than a predetermined value, the controller is configured to control the rotation speed of the air supply device to a speed which is higher than the first rotation speed and is lower than the second rotation speed.

16. A non-transitory computer readable storage medium on which a program for performing the method of claim 11 is recorded.

* * * * *